United States Patent
Kim et al.

(10) Patent No.: US 10,062,894 B2
(45) Date of Patent: Aug. 28, 2018

(54) RECHARGEABLE BATTERY INCLUDING CONNECTING MEMBER BETWEEN CAP PLATE AND TERMINAL PLATE

(71) Applicant: SAMSUNG SDI CO., LTD., Yongin-si, Gyeonggi-do (KR)

(72) Inventors: In Kim, Yongin-si (KR); Sang-Won Byun, Yongin-si (KR); Hong-Hyeon Lee, Yongin-si (KR); Sang Kyu Byun, Yongin-si (KR); Jae-Kyung Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 118 days.

(21) Appl. No.: 14/968,950

(22) Filed: Dec. 15, 2015

(65) Prior Publication Data

US 2016/0380246 A1 Dec. 29, 2016

(30) Foreign Application Priority Data

Jun. 23, 2015 (KR) .................. 10-2015-0089066

(51) Int. Cl.
*H01M 2/30* (2006.01)
*H01M 2/06* (2006.01)
*H01M 2/22* (2006.01)
*H01M 10/052* (2010.01)

(52) U.S. Cl.
CPC ............ *H01M 2/30* (2013.01); *H01M 2/06* (2013.01); *H01M 2/22* (2013.01); *H01M 10/052* (2013.01)

(58) Field of Classification Search
None
See application file for complete search history.

(56) References Cited

U.S. PATENT DOCUMENTS

| 3,129,047 A | * | 4/1964 | Bennett | H01M 2/22 439/388 |
| 2005/0079408 A1 | * | 4/2005 | Hirano | B60L 11/1874 429/82 |
| 2011/0177381 A1 | * | 7/2011 | Oya | H01M 2/202 429/158 |
| 2011/0256433 A1 | * | 10/2011 | Fuhr | H01M 2/1229 429/82 |
| 2015/0099163 A1 | * | 4/2015 | Kim | H01M 2/0473 429/178 |

FOREIGN PATENT DOCUMENTS

JP 08-287898 A 11/1996
KR 10-2013-0043537 A 4/2013

* cited by examiner

*Primary Examiner* — Lucas J. O'Donnell
(74) *Attorney, Agent, or Firm* — Lee & Morse, P.C.

(57) ABSTRACT

A rechargeable battery includes an electrode assembly including a first electrode and a second electrode inside a case, the case including an open side that is open, and a cap assembly that covers the open side. The cap assembly includes a cap plate that covers the open side, a first terminal that protrudes outside the cap plate and is electrically connected to the first electrode, a connecting member between the first terminal and the cap plate, the connecting member being in a form of a ring including a slit and being made of a conductive material, and an insulating member that covers at least a part of an upper side and a lower side of the connecting member such that another part of the upper side and the lower side of the connecting member is exposed, the insulating member being made of an insulating material.

7 Claims, 8 Drawing Sheets

RECHARGEABLE BATTERY INCLUDING CONNECTING MEMBER BETWEEN CAP PLATE AND TERMINAL PLATE

CROSS-REFERENCE TO RELATED APPLICATION

Korean Patent Application No. 10-2015-0089066, filed on Jun. 23, 2015, in the Korean Intellectual Property Office, and entitled: "Rechargeable Battery," is incorporated by reference herein in its entirety.

BACKGROUND

1. Field

Embodiments relate generally to a rechargeable battery.

2. Description of the Related Art

A rechargeable battery is a battery that can be charged and discharged, unlike a primary battery that cannot be recharged. A low-capacity rechargeable battery may be used for small portable electronic devices such as a mobile phone, a laptop computer, and a camcorder, and a large-capacity battery may be used as a power supply for driving a motor such as for a hybrid vehicle.

Recently, a high power rechargeable battery using a non-aqueous electrolyte of a high energy density has been developed. The high power rechargeable battery may be configured as a large-capacity rechargeable battery by connecting a plurality of rechargeable batteries in series so as to be useable for devices requiring a large amount of power, for example, for driving a motor such as for an electric vehicle.

Further, one large-capacity rechargeable battery may be configured as a plurality of rechargeable batteries connected in series, wherein the rechargeable battery may be formed in a cylindrical shape or a square shape.

SUMMARY

Embodiments are directed to a rechargeable battery including an electrode assembly including a first electrode and a second electrode, a case that receives the electrode assembly, the case including one side that is open, and a cap assembly that covers the one side of the case that is open. The cap assembly includes a cap plate that covers the one side of the case that is open, a first terminal that protrudes outside the cap plate and is electrically connected to the first electrode, a connecting member between the first terminal and the cap plate, the connecting member being in a form of a ring including a slit and being made of a conductive material, and an insulating member that covers at least a part of an upper side and a lower side of the connecting member such that another part of the upper side and the lower side of the connecting member is exposed, the insulating member being made of an insulating material.

The insulating member may include a first insulating layer that covers a part of the upper side of the connecting member and a second insulating layer that covers a part of the lower side of the connecting member.

A first exposed side on which the first insulating layer is not formed may be located on another part of the upper side of the connecting member. A second exposed side on which the second insulating layer is not formed may be located on another part of the lower side of the connecting member. The first exposed side and the second exposed side may extend in opposite directions with reference to the slit such that the first exposed side and the second exposed side do not overlap.

The first exposed side and second exposed side may be located in a region near the slit on the connecting member.

The case may be electrically connected to the first electrode.

The connecting member may include a long side and a short side. The slit may be located on a selected one of the long side and the short side of the connecting member.

The connecting member may include a hollow portion. The hollow portion may be eccentrically provided to be close to or distant from an edge of the connecting member including the slit.

BRIEF DESCRIPTION OF THE DRAWINGS

Features will become apparent to those of skill in the art by describing in detail exemplary embodiments with reference to the attached drawings in which:

FIG. 7A is a plan view, FIG. 7B is a cross-sectional view taken along the line C-C, and FIG. 7C is a bottom view.

FIG. 8A is a plan view, FIG. 8B is a cross-sectional view taken along the line D-D, and FIG. 8C is a bottom view.

DETAILED DESCRIPTION

Figure 1:
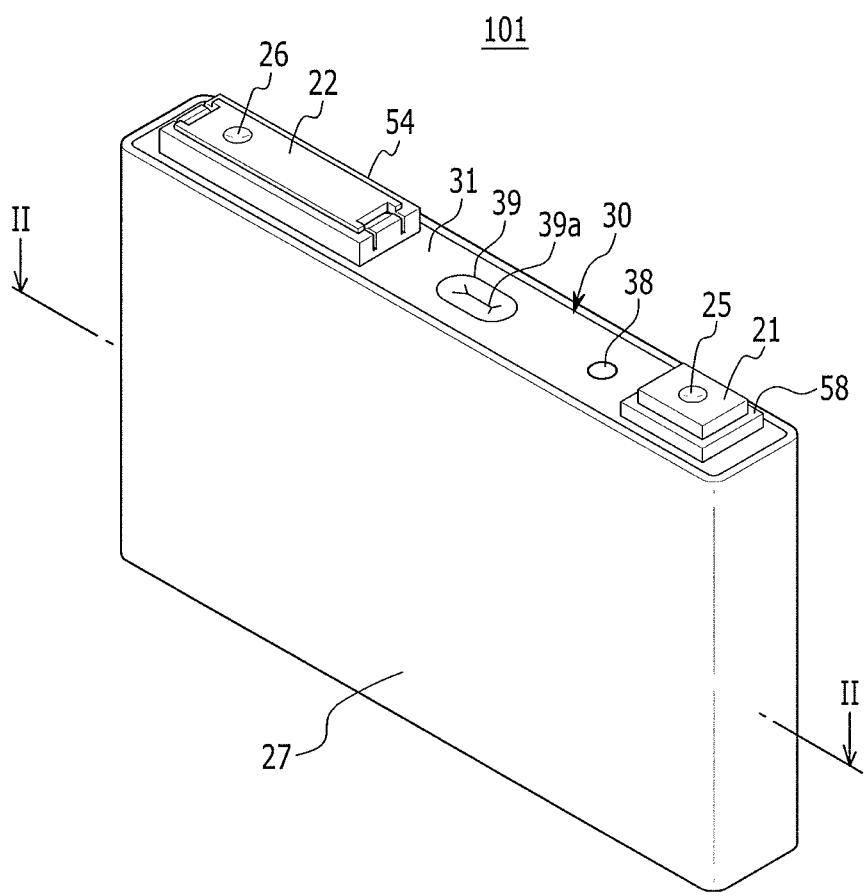
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
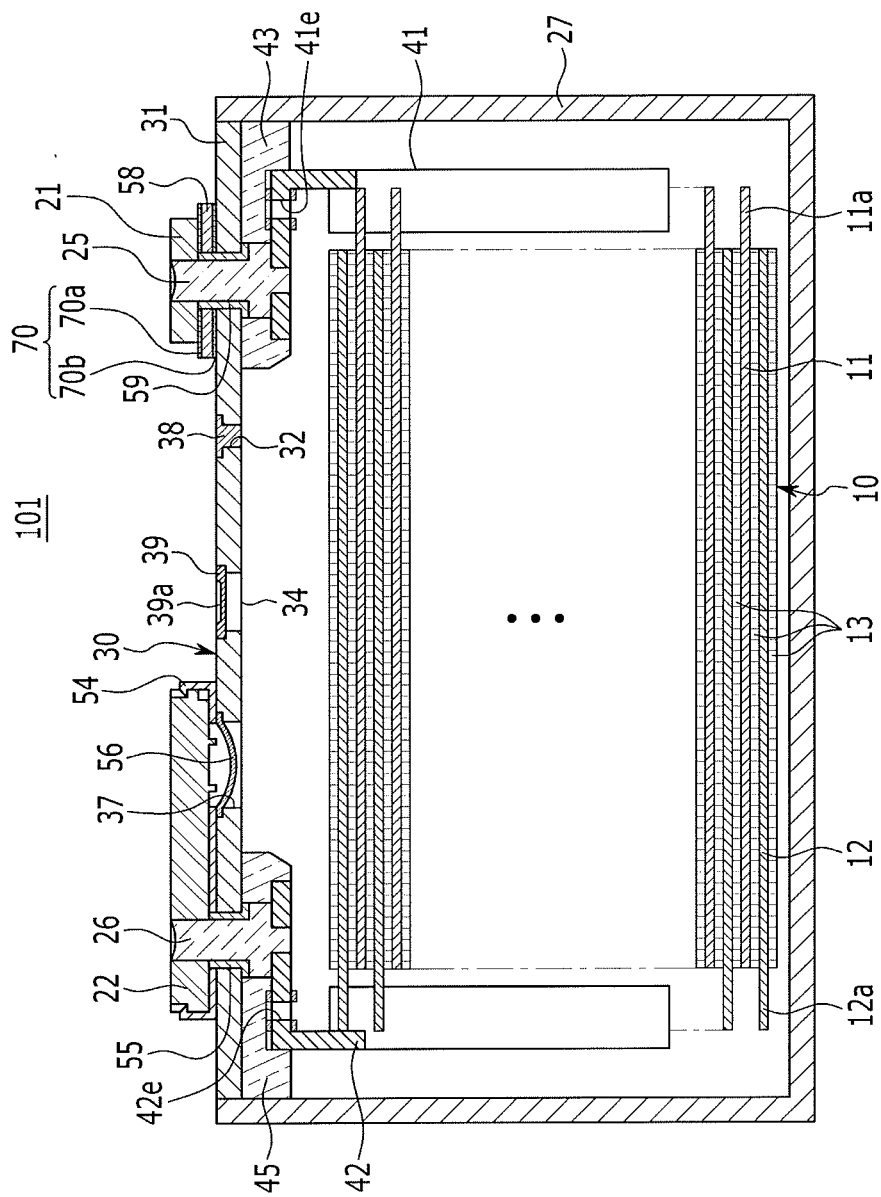
FIG. 2 illustrates a cross-sectional view with respect to a line II-II of FIG. 1.

FIG. 1 illustrates a perspective view of a rechargeable battery according to an exemplary embodiment, and FIG. 2 illustrates a cross-sectional view with respect to a line II-II of FIG. 1.

Referring to FIG. 1 and FIG. 2, the rechargeable battery 101 according to a first exemplary embodiment may include: an electrode assembly 10 spirally wound with a separator 13 between a first electrode 11 and a second electrode 12; a case 27 that receives the electrode assembly 10 and including a side that is open; and a cap assembly 30 that covers an opened portion of the case 27.

For better comprehension and ease of description, the first electrode 11 will indicate a positive electrode and the second electrode 12 will indicate a negative electrode.

The rechargeable battery 101 will be exemplified as a square-type lithium ion secondary battery. In other implementations, the rechargeable battery 101 may be of other suitable types or configurations, such as a lithium polymer battery or a cylindrical battery.

The positive electrode 11 and the negative electrode 12 may include a coated region that is a region generated by applying an active material to a current collector formed with a metal foil in a thin plate shape, and uncoated regions 11a and 12a that are regions to which the active material is not coated. The positive uncoated region 11a may be formed at one end of the positive electrode 11 in a length direction of the positive electrode 11, and the negative uncoated region 12a may be formed at another end of the negative electrode 12 in a length direction of the negative electrode 12. The positive electrode 11 and the negative electrode 12 may be spirally wound with the separator 13 which is an insulator therebetween.

In other implementations, the electrode assembly 10 may be configured by stacking the positive electrode and the negative electrode formed with a plurality of sheets with a separator therebetween.

The case 27 may have a substantially cuboidal shape, and an opening may be formed on one side of the case 27. The case 27 may be made of a metal such as aluminum or stainless steel.

The cap assembly 30 included in the rechargeable battery according to an exemplary embodiment may include a cap plate 31, a first terminal 21, a connecting member 58, and an insulating member 70 (see FIGS. 3-8).

The cap plate 31 may cover the opened portion of the case 27. The cap plate 31 may be formed as a thin plate that extends in one direction and is combined to the opening of the case 27. A seal stopper 38 may be installed in an electrolyte injection opening 32 of the cap plate 31, and a vent plate 39 having a notch 39a adapted to fracture at a threshold pressure may be installed in a vent hole 34. The first terminal 21 and a second terminal 22 may protrude to an upper portion of the cap plate 31.

The first terminal 21 may protrude outside the cap plate 31 and may be electrically connected to the first electrode.

The first terminal 21 may be electrically connected to the positive electrode 11 with a first current collecting member 41 as a medium. The second terminal 22 may be electrically connected to the negative electrode 12 with a second current collecting member 42 as a medium. In other implementations, the first terminal 21 may be electrically connected to the negative electrode and the second terminal 22 may be electrically connected to the positive electrode.

The first terminal 21 may be formed as a rectangular plate. The first terminal 21 may be electrically connected to the positive electrode 11 with a connecting terminal 25 bonded to the first current collecting member 41 as a medium. The connecting terminal 25 may be in a form of a pillar. An upper portion of the connecting terminal 25 may be inserted into the first terminal 21 and fixed to the first terminal 21 through welding.

The lower portion of the connecting terminal 25 may be fixed to an upper portion of the first current collecting member 41 through welding. The first current collecting member 41 may electrically connect the connecting terminal 25 and the first electrode 11.

A sealing gasket 59 may be inserted into a hole through which a terminal passes between the first terminal 21 and the cap plate 31. A lower insulating member 43 that supports the first current collecting member 41 may be installed below the cap plate 31.

The connecting member 58 may be made of a conductive material and may be formed to have a ring shape. For example, the connecting member 58 may have a "C" shape A slit 58a may be formed in the connecting member 58. The slit 58a may be a portion that is cut from the connecting member 58.

The connecting member 58 may be provided between the first terminal 21 and the cap plate 31. The connecting member 58 electrically connects the first terminal 21 and the cap plate 31. The cap plate 31 and the case 27 are accordingly charged as positive.

The insulating member 70 may be formed to cover at least part of an upper side and at least part of a lower side of the connecting member 58. The insulating member 70 may expose part of the upper side and the lower side of the connecting member 58. The insulating member 70 may not cover the whole upper side or the whole lower side of the connecting member 58. The insulating member 70 may be made of an insulating material. For example, the insulating member 70 may be an insulating tape. In some implementations, the insulating member 70 may be manufactured by coating an insulating material on the upper side and the lower side of the connecting member 58 and curing the same.

Figure 3:
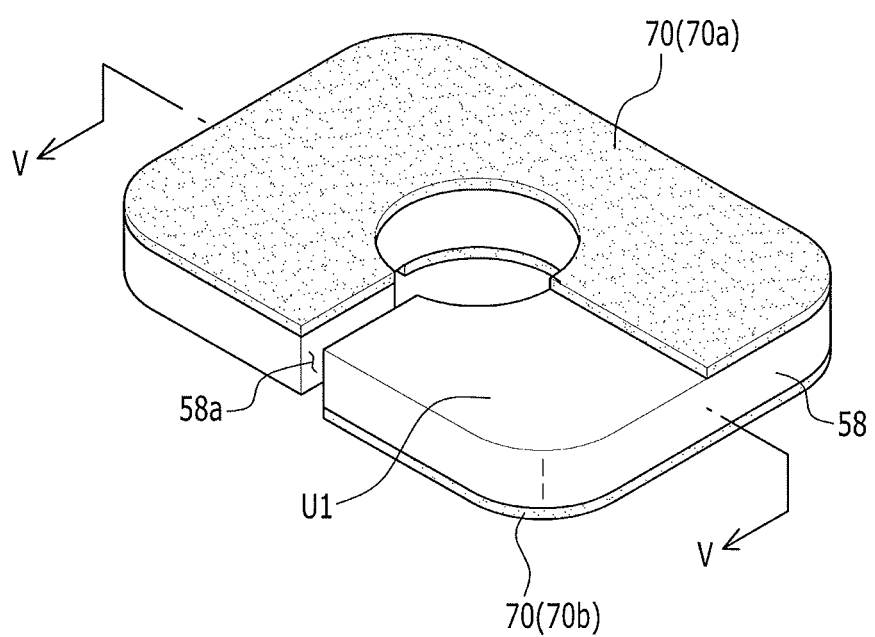
FIG. 3 illustrates a perspective view of a connecting member included in a rechargeable battery according to an exemplary embodiment.
Figure 4:
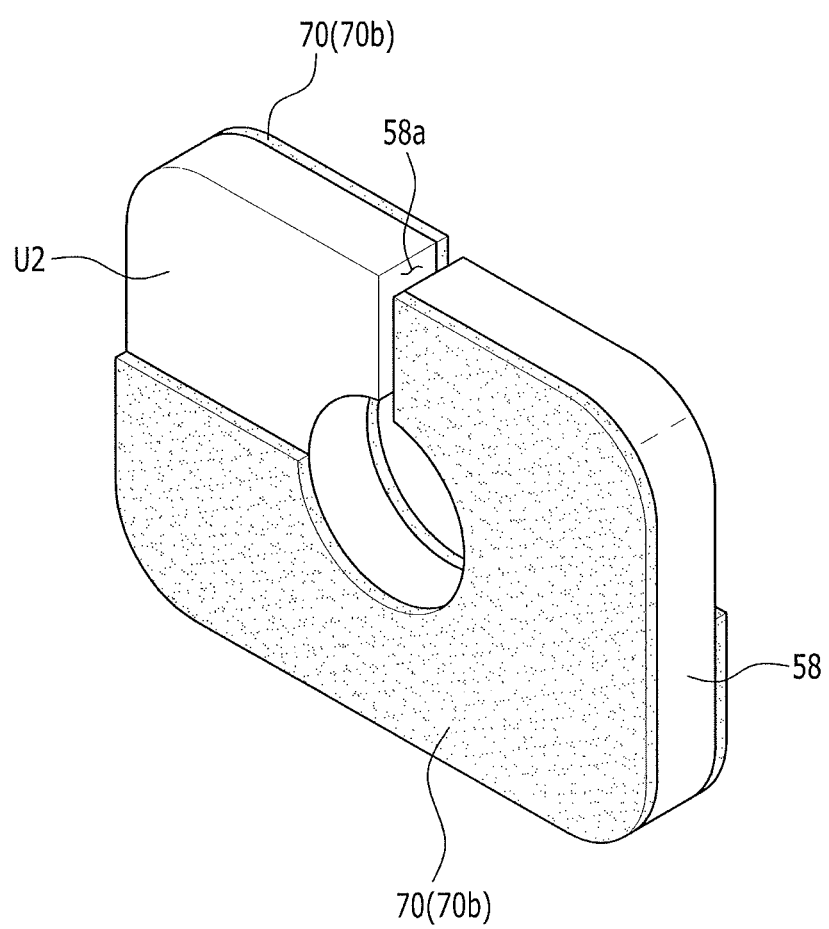
FIG. 4 illustrates a perspective view of a connecting member of FIG. 3 seen from below.
Figure 5:
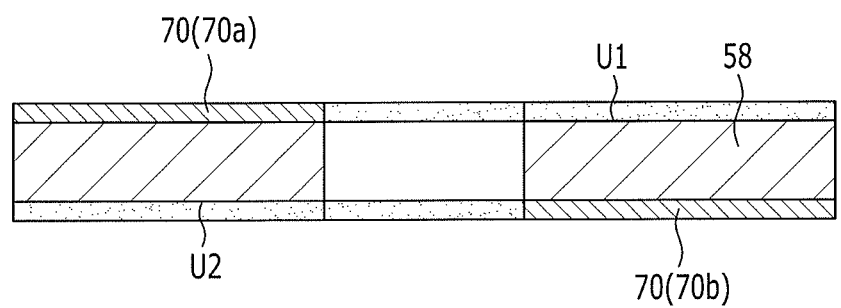
FIG. 5 illustrates a cross-sectional view of a connecting member shown in FIG. 3 with respect to a line V-V.

FIG. 3 illustrates a perspective view of a connecting member 58 included in the rechargeable battery 101 according to an exemplary embodiment, FIG. 4 illustrates a perspective view of a connecting member of FIG. 3 seen from below, and FIG. 5 illustrates a cross-sectional view of a connecting member shown in FIG. 3 with respect to a line V-V.

Referring to FIG. 3 to FIG. 5, the insulating member 70 may include, for example, a first insulating layer 70a and a second insulating layer 70b.

The first insulating layer 70a may cover part of the upper side of the connecting member 58.

The second insulating layer 70b may cover part of the lower side of the connecting member 58.

For example, a first exposed side U1 on which the first insulating layer 70a is not formed may be located on part of the upper side of the connecting member 58. A second exposed side U2 on which the second insulating layer 70b is not formed may be located on part of the lower side of the connecting member 58.

The first exposed side U1 and the second exposed side U2 may be provided to extend in opposite directions with reference to the slit 58a such that the first exposed side U1 and the second exposed side U2 do not correspond from top to bottom or, for example, overlap in a thickness direction of the connecting member. The first exposed side U1 and the second exposed side U2 may be respectively formed in regions of the connecting member 58 located near the slit 58a.

For example, the first exposed side U1 may be provided in a right region on the upper side of the connecting member 58, and the second exposed side U2 may be provided in a left region on the lower side of the connecting member 58.

Figure 6:
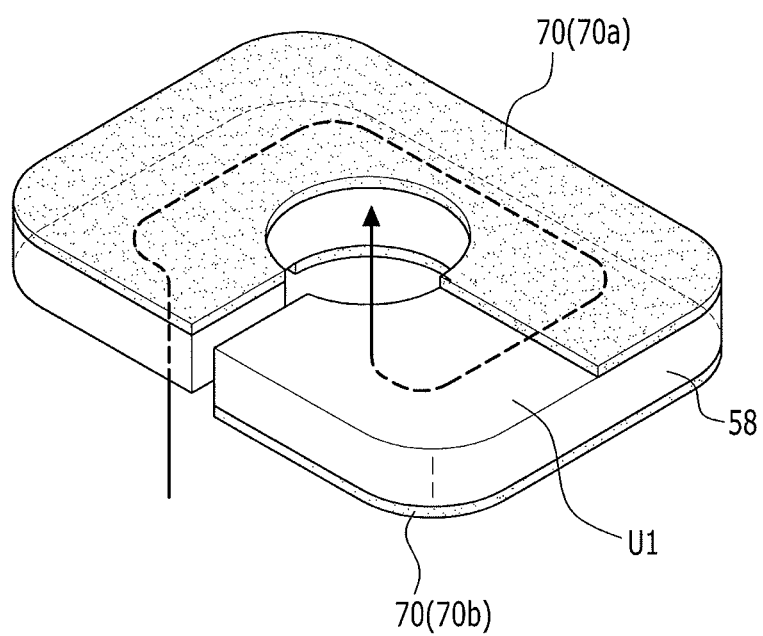
FIG. 6 illustrates a current moving path on a connecting member included in a rechargeable battery according to an exemplary embodiment.

FIG. 6 illustrates a current moving path through a connecting member included in a rechargeable battery according to an exemplary embodiment.

As shown in FIG. 6, regarding the above-structured rechargeable battery according to an exemplary embodiment, the slit 58a may be formed in the connecting member 58 and the insulating member 70 may be formed on the connecting member 58 such the current flowing path (L) may extend and resistance may be increased compared to a configuration of the connecting member in which the slit 58a and the insulating member 70 are not formed.

When a high current is applied to the first electrode 11 (refer to FIG. 2) by over-discharging or overcharging, resistance of the connecting member 58 may be greater than in the conventional configuration such that the current moving along the connecting member 58 may be reduced, thereby helping to prevent the rechargeable battery from being ignited.

Referring to FIG. 2, the cap assembly 30 may include the second terminal 22 electrically connected to the negative electrode.

The second terminal 22 may be formed to be a rectangular plate. The second terminal 22 may be electrically connected to the negative electrode 12 through a connecting terminal 26 bonded to the second current collecting member 42 as a medium. The connecting terminal 26 may pass through the cap plate 31 and the second terminal 22, and an upper portion of the connecting terminal 26 may be fixed to the second terminal 22.

The connecting terminal 26 may be in a form of a pillar. An upper portion of the connecting terminal 26 may be fixed to the second terminal 22 through welding while inserted into the second terminal 22. The lower portion of the connecting terminal 26 may be fixed to the second current collecting member 42 through welding. The second current collecting member 42 may electrically connect the connecting terminal 26 and the second electrode 12.

A sealing gasket 55 may be inserted into a hole through which a terminal passes between the second terminal 22 and the cap plate 31. A lower insulating member 45 that insulates the second terminal 22 and the second current collecting member 42 on the cap plate 31 may be installed below the cap plate 31.

A short-circuit protrusion that protrudes toward a short-circuit hole 37 may be formed on a lower portion of the second terminal 22. The second terminal 22 may be formed to extend in one direction to cover the short-circuit hole 37. An upper insulating member 54 that electrically insulates the second terminal 22 and the cap plate 31 may be installed between the second terminal 22 and the cap plate 31.

The cap assembly 30 may include a short-circuit member 56 that short-circuits the positive electrode 11 and the negative electrode 12. The short-circuit member 56 may be electrically connected to the cap plate 31 and may be transformed and connected to the second terminal 22 when an internal pressure of the rechargeable battery 101 increases above a predetermined limit.

The short-circuit hole 37 may be formed in the cap plate 31, and the short-circuit member 56 may be disposed between the upper insulating member 54 and the cap plate 31 in the short-circuit hole 37. The second terminal 22 may be disposed to cover the short-circuit hole 37 on an upper portion of the short-circuit hole 37. The short-circuit member 56 may be curved to bend as a convex arc downward, and may include an edge formed outside the curve and fixed to the cap plate 31.

Figure 7:
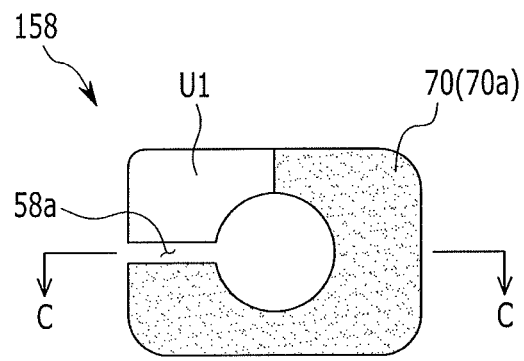
FIGS. 7A-7C illustrate an exemplary variation of a connecting member in a rechargeable battery according to an exemplary embodiment.
Figure 7B:
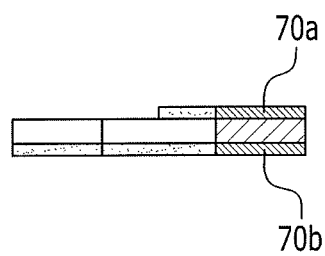
Figure 7C:
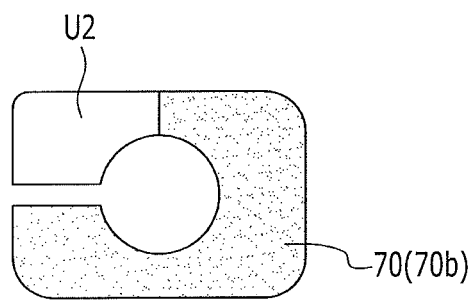
Figure 8A:
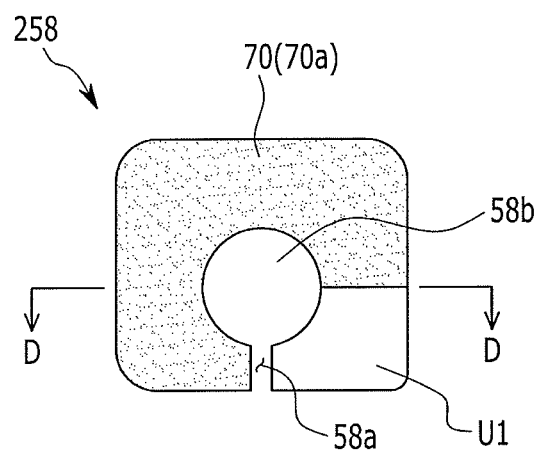
FIGS. 8A-8C illustrate another exemplary variation of a connecting member in a rechargeable battery according to an exemplary embodiment.
Figure 8B:
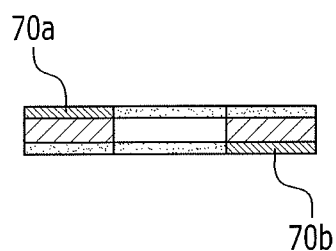
Figure 8C:
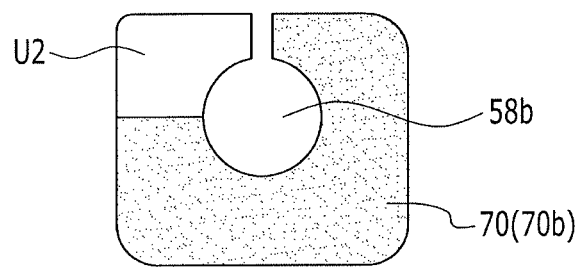

FIGS. 7A-7C and FIGS. 8A-8C illustrate exemplary variations of a connecting member in a rechargeable battery according to an exemplary embodiment. FIGS. 7A and 8A are plan views, FIGS. 7B and 8B are cross-sectional views taken along the line C-C and D-D, respectively, and FIGS. 7C and 8C are bottom views.

Referring to FIG. 7A to 7C, a connecting member 158 may be formed to include a long side and a short side. The slit 58a may be formed on a selected one of the long side and the short side of the connecting member 158. In the embodiment illustrated in FIG. 3, the slit 58a is formed on the long side of the connecting member 58 to extend in a direction parallel to the short side in the rechargeable battery 101. In the embodiment illustrated in FIG. 7, the slit 58a may be formed on the short side of the connecting member to extend in a direction parallel to the long side. The position of the slit 58a may be modified as desired.

Referring to FIG. 8A to 8C, a hollow portion 58b may be formed in the connecting member 258. The hollow portion 58b may be eccentrically provided to be close to or distant from the slit 58a. FIG. 8 illustrates that the hollow portion 58b is eccentric near the slit 58a.

By way of summation and review, when a rechargeable battery having a metal case is over-discharged or over-charged, there is a risk that the rechargeable battery may be ignited by a high current that instantaneously occurs.

Embodiments provide a rechargeable battery with improved safety. According to embodiments of a rechargeable battery, a slit may be formed on a connecting member between and electrode terminal and a cap plate, and an insulating member may be formed on the connecting member such a current flowing path may be extended and resistance may be increased compared to the configuration of a connecting member that does not have a slit and an insulating member.

Therefore, even when the high current is applied to a first electrode by over-discharging or overcharging, resistance of the connecting member is further increased compared to a structure without the slit and insulating member such the current may be reduced while moving along the connecting member. Accordingly, the rechargeable battery may be prevented from being ignited.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. A rechargeable battery, comprising:
   an electrode assembly including a first electrode and a second electrode;
   a case that receives the electrode assembly, the case including one side that is open; and
   a cap assembly that covers the one side of the case that is open,
   wherein the cap assembly includes:
   a cap plate that covers the one side of the case that is open;
   a first terminal plate outside the cap plate, the first terminal plate being electrically connected to the first electrode through a connecting terminal protruding through the cap plate;
   a connecting member between the first terminal plate and the cap plate, the connecting member being in a form of a ring including:

a hollow portion through which the connecting terminal passes, the connecting terminal being spaced apart laterally from an inner circumferential surface of the hollow portion; and a slit that extends from an outer side edge of the connecting member to the hollow portion, the connecting member being made of a conductive material; and an insulating member that covers at least a part of an upper side and a lower side of the connecting member such that another part of the upper side and the lower side of the connecting member is exposed, the insulating member being made of an insulating material.

2. The rechargeable battery as claimed in claim 1, wherein the insulating member includes:

a first insulating layer that covers a part of the upper side of the connecting member; and a second insulating layer that covers a part of the lower side of the connecting member.

3. The rechargeable battery as claimed in claim 2, wherein:

a first exposed side on which the first insulating layer is not formed is located on another part of the upper side of the connecting member, a second exposed side on which the second insulating layer is not formed is located on another part of the lower side of the connecting member, and the first exposed side and the second exposed side extend in opposite directions with reference to the slit such that the first exposed side and the second exposed side are not in an overlapping relationship.

4. The rechargeable battery as claimed in claim 3, wherein the first exposed side and second exposed side are located in a region near the slit on the connecting member.

5. The rechargeable battery as claimed in claim 1, wherein the case is electrically connected to the first electrode.

6. The rechargeable battery as claimed in claim 1, wherein the connecting member includes a long outer side edge and a short outer side edge, and the slit is located on a selected one of the long outer side edge and the short outer side edge of the connecting member.

7. The rechargeable battery as claimed in claim 1, wherein the hollow portion is eccentrically provided to be close to or distant from an outer side edge of the connecting member from which the slit extends.

* * * * *